United States Patent [19]

Sjogren

[11] 4,361,198

[45] Nov. 30, 1982

[54] SCALE PAD AND VALVE STRUCTURE

[75] Inventor: Fred E. Sjogren, Coos Bay, Oreg.

[73] Assignees: Glenda J. Sjogren; Alan L. Sjogren, both of Coos Bay; Kenneth A. Sjogren, Coquille, all of Oreg. ; part interest to each

[21] Appl. No.: 209,312

[22] Filed: Nov. 21, 1980

[51] Int. Cl.³ ............................................. G01G 19/10
[52] U.S. Cl. ..................................... 177/141; 177/208
[58] Field of Search ................ 177/208, 141; 137/533, 137/533.21, 534, 538

[56] References Cited

U.S. PATENT DOCUMENTS

| 2,020,307 | 11/1935 | Fitch | 177/141 X |
| 2,867,433 | 1/1959 | Bergenheim | 177/141 X |
| 4,162,710 | 7/1979 | Sjogren | 177/141 |

*Primary Examiner*—Joseph W. Hartary

[57] ABSTRACT

A horizontal table is provided for rigid support from a vehicle mounting portion and an upper plate including a downwardly directed peripheral flange is centered over the table and a diaphragm is sealingly secured to and extends between remote portions of the peripheral flange below the top plate and overlies and is supported from the table. The top plate is mounted from the table for limited vertical and horizontal shifting relative thereto and limited canting in all directions. A vertically elongated pop-off valve assembly is sealingly secured through a central portion of the table and includes an upwardly projectable piston plunger engageable with the underside of the top plate in response to the valve assembly being charged at its lower end and valve assembly includes structure operative to effect venting of the lower end thereof to the ambient atmosphere in response to upward movement of the plunger to its uppermost limit position.

4 Claims, 4 Drawing Figures

SCALE PAD AND VALVE STRUCTURE

BACKGROUND OF THE INVENTION

Logging trucks are conventionally equipped with four scale pads, two of which are on the tractor and two of which are on the trailer. The tractor includes a log bunk pivotally supported therefrom and with a corresponding pair of scale pads disposed beneath opposite sides of the tractor log bunk. The trailer is also equipped with a log bunk and trailer scale pads are disposed under opposite sides of the trailer log bunk. The scale pads, when pressurized, elevate the log bunks and the load supported therefrom. The scale pads are pneumatically operated and are constructed to vent to the ambient atmosphere after being elevated to the uppermost positions. As long as the tractor and trailer are disposed on reasonably level ground, the pressure required to maintain the scale pads elevated below their maximum elevation may be transposed into weight readings whereby the load supported from the bunks may be determined. However, in most instances, the areas in which the trucks are loaded with logs are not level resulting in uneven loading on the scale pads and if the scale pads are tilted and equipped with conventional side mounted pop-off valves, one pad will render a light reading, but in reality the true weight will be greater. The reason for this inaccurate weight reading is because the conventional side mounted pop-off valve is allowed to vent to the ambient atmosphere short of its lift. If a conventional scale pad is tilted downward toward the side of the conventional pop-off valve, the weight reading will be light. The reason for this is that the scale pad is forced to travel further in order to vent to the ambient atmosphere. As a result, the scale pad is over-pressurized and thereby renders a heavy weight reading. Accordingly, a need exists for scale pads which will be capable of rendering a true reading of the loading on the corresponding log bunks, even if the truck being loaded is disposed on uneven ground. Various forms of previously known scale pads and similar structures are disclosed in U.S. Pat. Nos. 2,501,730, 3,327,797, 3,695,100 and 4,162,710.

The instant invention comprises an improvement on the above last-mentioned patent and the improvement resides in modifications which have been made to the pop-off valve assembly. These modifications include structure by which the pop-off valve assembly is more positively fluid-tight sealed relative to the central portion of the flexible diaphragm and structure of the improved valve assembly whereby venting of the lower portion of the valve assembly to the ambient atmosphere is effected at the uppermost limit of movement of the piston portion of the valve assembly.

BRIEF DESCRIPTION OF THE INVENTION

The scale pad of the instant invention includes an improved valve assembly which may be more readily serviced and installed and which includes venting structure operative to vent the lower portion of the valve assembly to the ambient atmosphere upon upward displacement of the piston portion thereof to its uppermost limit position.

The valve assembly is also constructed in a manner to insure proper sealed engagement of the valve assembly with the associated scale pad diaphragm.

The main object of this invention is to provide a scale pad pop-off valve assembly which may be utilized to render an accurate determination of the weight support by the associated scale pad.

Another object of this invention is to provide a scale pad pop-off valve of improved construction wherein an airtight seal relative to the diaphragm of the associated scale pad and the valve may be assured.

Still another object of this invention is to provide a scale pad pop-off valve constructed in a manner whereby its maintenance and/or replacement may be readily effected.

A final object of this invention to be specifically enumerated herein is to provide an improved log truck scale pad and pop-off valve assembly in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
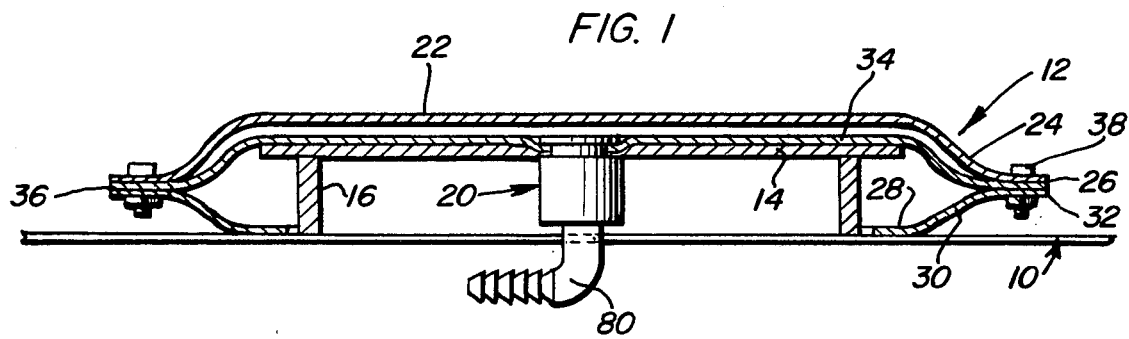
FIG. 1 is a vertical sectional view taken substantially upon a plane passing through the center of a scale pad and with the scale pad in a substantially relaxed position.
Figure 2:
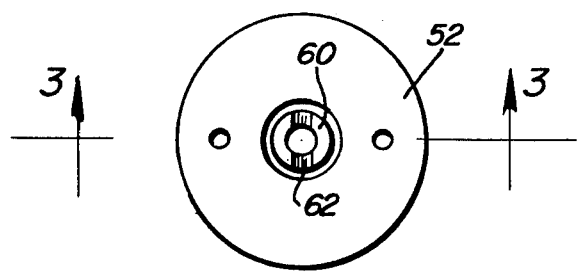
FIG. 2 is a top plan view of the pop-off valve of the instant invention.
Figure 4:
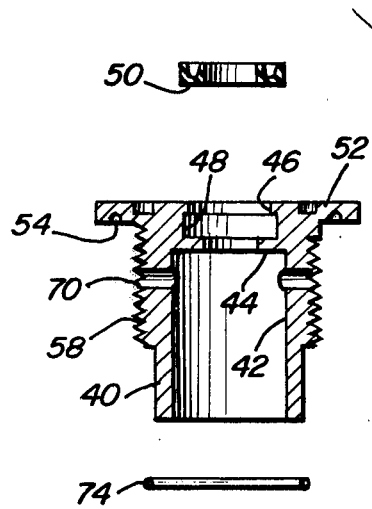
FIG. 4 is an exploded vertical sectional view of the pop-off valve.

Referring now more specifically to the drawings, the numeral 10 generally designates a tractor mounting portion from which a scale pad referred to in general by the reference numeral 12 and constructed in accordance with the present invention is supported. The scale pad 12 includes a circular table 14 including a depending cylindrical support portion 16 mounted on the portion 10. The cylindrical support portion 16 is coaxial with the table 14 and the center of the table 14 has an opening 18 formed therein through which the pop-off valve assembly of the instant invention and referred to in general by the reference numeral 20 projects.

The scale pad 12 further includes a top plate 22 including a downwardly and outwardly inclined peripheral flange 24 terminating downwardly in an integral annular mounting flange 26. A lower annular plate 28 is provided and includes an upwardly and outwardly inclined peripheral flange 30 terminating upwardly in an annular mounting flange 32. The lower plate 28 underlies the top plate 22 and the inner peripheral portion of the lower plate 28 is received beneath the outer periphery of the table 14 outwardly of the cylindrical support portion 16.

A circular, flexible and air impervious diaphragm 34 is disposed over the table 14 and includes an outer peripheral portion 36 sealingly secured between the mounting flange portions 26 and 32. The mounting flange portions 26 and 32 are clampingly secured together by fasteners 38 secured therethrough and also through the outer peripheral portion 36 of the diaphragm 34.

Figure 3:
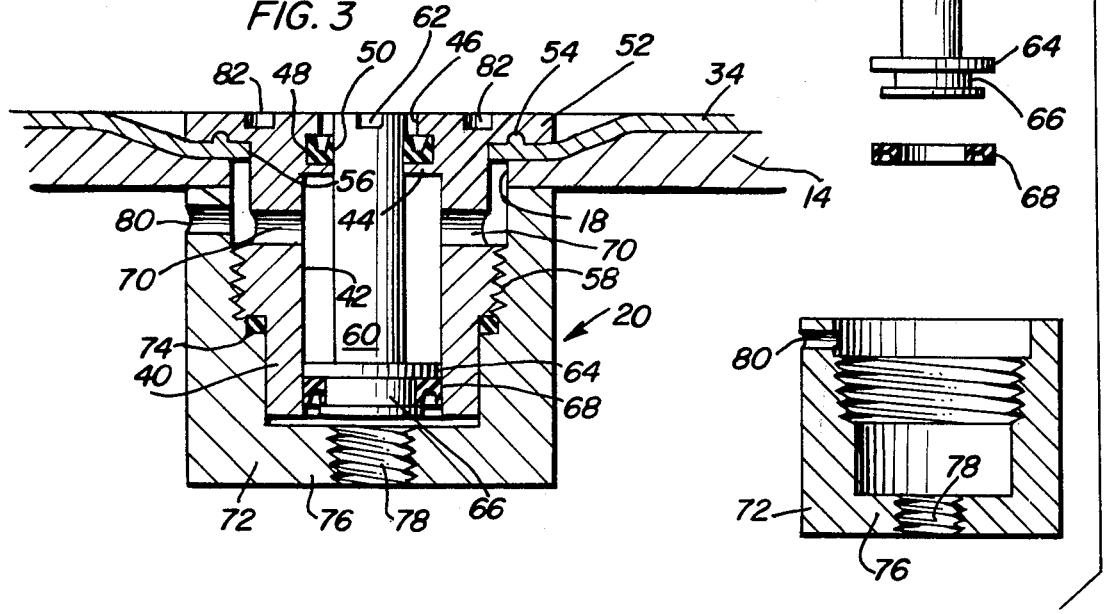
FIG. 3 is an enlarged vertical sectional view of the pop-off valve in operative association with the adjacent components of the scale pad.

With attention now invited more specifically to FIG. 3 of the drawings, it may be seen that the pop-off valve assembly 20 includes a vertical cylinder 40 having a bore 42 formed therethrough including a first annular inwardly projecting rib 44 spaced from its upper end and a second inwardly projecting annular rib 46 at the upper end of the cylinder 40 spaced slightly above the rib 44 and defining a seal receiving groove 48 intermediate the ribs 44 and 46. A seal 50 is seated in the groove 48 and the upper end of the cylinder 40 includes a radially outwardly projecting circumferential abutment flange 52 whose undersurface is equipped with a downwardly opening circumferential groove 54.

The central portion of the diaphragm 34 has an opening 56 formed therein through which the upper end of the cylinder 40 is received and the abutment flange 52 is downwardly abutted against the upper surface of the diaphragm 34 disposed about the opening 56. Further, the vertical mid-portion of the cylinder 40 includes an externally threaded diametrically enlarged portion 58.

A plunger 60 is disposed within the bore 42 and is slidingly received through the seal 50. The plunger 60 is tubular and includes diametrically opposite notches 62 formed in its upper end portion. The lower end portion of the plunger 60 includes a diametrically enlarged piston head 64 thereon and the head 64 defines a circumferential groove 66 in which a sealing ring 68 is seated, the sealing ring 68 defining a sliding airtight seal between the piston head 64 and the bore 42.

When the upper notched end of the plunger 60 is flush with the upper end of the cylinder 40, the piston head 64 is disposed in the lower end of the bore 42. The upper end of the cylinder 40 includes a pair of diametrically opposite radial vent ports 70 formed therein and a sleeve-type nut 72 is threadedly engaged with the portion 58 below the table 14. The upper end of the nut 72 abuts against the underside of the table 14 and tightening of the nut 72 on the portion 58 causes those portions of the diaphragm 34 disposed about the opening 56 to be clampingly engaged between the abutment flange 52 and the table 14, portions of the diaphragm 34 disposed about the opening 56 being upwardly displaced into the seal groove 54 formed in the underside of the abutment flange 52. In addition, a seal ring 74 is provided for forming a fluid-tight seal between the cylinder 40 and the nut 72. The lower end of the nut 72 includes an end wall 76 to thereby enclose the lower end of the cylinder 40 and the end wall 76 has a threaded port 78 formed therein into which the outlet end of an inlet fitting 80 is removably threadedly engaged.

The vent ports 70 are spaced below the rib 44 a distance substantially equal to the axial thickness of the piston head 64 from the upper end thereof to the lower extremity of the seal or ring 68 and the vent port 70 open outwardly into the portion of the interior of the nut 72 spaced above the portion 58 defining an annular chamber about the upper end of the cylinder 40. In addition, the nut 72 includes a single lateral vent port 80 which opens outwardly of the aforementioned outer chamber and, therefore, which serves to allow air vented through the port 70 to be discharged into the ambient air.

The operation of the pop-off valve assembly 20 is substantially identical to the operation of the pop-off valve assembly (36) disclosed in my prior U.S. Pat. No. 4,162,710, except that the instant pop-off valve assembly 20 does not require a relief port in addition to a vent port. The ports 70, because of their positioning immediately adjacent the uppermost position of travel of the piston head 64, serve the purpose of vent ports as well as relief ports. Also, the groove 54 insures an airtight seal between the pop-off valve assembly 20 and the diaphragm 34 and the upper end of cylinder 42 includes small spanner wrench receiving recesses 82 formed therein for ease in tightening and loosening the nut 72.

It is, of course, to be noted that the scale pad illustrated and described herein comprises a substantial equivalent of the scale pad disclosed in my above-mentioned prior patent and, therefore, that the operation of the scale pad and its various related components (not shown) is also identical.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A scale pad for log bunk, said pad including a horizontal table having a central portion and an outer peripheral portion, an upper top plate centered over said table and including an outer peripheral portion, a diaphragm between said top plate and table and secured across and to the outer peripheral portions of said top plate, the central portion of said table and the overlying portion of said diaphragm having registered central openings formed therein, said top plate and table including coacting means guiding said top plate from said table for vertical movement relative thereto, limited horizontal shifting relative thereto and limited canting relative thereto in all directions about a central zone of said table, an elongated pop-off valve assembly sealingly secured through said central portion of said table and the overlying portion of said diaphragm, said pop-off valve assembly including an elongated upstanding sleeve having air inlet means at its lower end and an open upper end provided with a radially outwardly projecting and downwardly facing peripheral abutment flange, said sleeve being passed through said registered openings and said abutment flange overlying the marginal portions of said diaphragm defining the central opening therein, a tubular piston plunger reciprocally received in said sleeve and including a piston thereon between said inlet means, the upper end of said plunger being sealingly slidable through the upper sleeve end, a vent port in said sleeve between said inlet means and said upper sleeve end below said table, said vent port being spaced above said piston when the latter is in its lower limit position and said piston being upwardly displaceable in said sleeve at least to the level of said vent port upon upwardward movement of said piston in said sleeve, said sleeve including a diametrically enlarged externally threaded portion below said vent port, the lower end of said sleeve being open and defining the air inlet means at the lower end of said sleeve, an internally threaded closure nut threadedly engaged on said externally threaded portion and extending below said sleeve, the lower end of said nut including an end wall underlying the lower end of said sleeve and having a fluid pressure inlet port formed therein, the upper end portion of said nut defining an annular channel extending thereabout externally of the upper end portion of said sleeve below said table in which said vent port is formed and into which said vent port opens, the upper end of said nut being tightened against a downwardly facing abutment surface portion of said table extending about the central opening therein through which said sleeve is received, the upper end of said nut including a generally radial port opening into said channel, the portions of said diaphragm and table disposed about said openings being clampingly engaged between said abutment flange and the upper end of said nut and the threaded engagement of said nut with said sleeve as well as the abutting engagement of the upper end of said nut with the undersurface of said table serving to reinforce said pop-off valve assembly against breakage as a result of lateral forces being directed thereon below said horizontal table.

2. The scale pad of claim 1 wherein said table includes a depending support portion for rigid support from an underlying vehicle mounting portion, said support portion depending downwardly from said table to a level spaced below the lower end of said pop-off valve assembly.

3. The combination of claim 1 wherein the underside of said abutment flange includes a circumferential seal groove formed therein.

4. The combination of claim 1 including seal structure operatively associated with said nut and said sleeve below said diametrically enlarged externally threaded portion forming a fluid-tight seal between said sleeve and said nut.

* * * * *